(12) United States Patent
Muirhead et al.

(10) Patent No.: US 7,271,826 B2
(45) Date of Patent: Sep. 18, 2007

(54) COMMUNICATIONS INSTALLATION FOR AIRCRAFT

(75) Inventors: Andrew Muirhead, Norderstedt (DE); Henry Starke, Ellerbeck (DE)

(73) Assignee: Lufthansa Technik AG, Hamburg (DE)

( * ) Notice: Subject to any disclaimer, the term of this patent is extended or adjusted under 35 U.S.C. 154(b) by 424 days.

(21) Appl. No.: 10/188,367

(22) Filed: Jul. 3, 2002

(65) Prior Publication Data

US 2004/0004661 A1   Jan. 8, 2004

(51) Int. Cl.
    *H04N 7/18*   (2006.01)
    *H04N 9/47*   (2006.01)
(52) U.S. Cl. .................................... 348/144
(58) Field of Classification Search ............. 348/143, 348/144, 148, 160; H04N 7/18
    See application file for complete search history.

(56) References Cited

U.S. PATENT DOCUMENTS

| | | | |
|---|---|---|---|
| 4,697,761 A * | 10/1987 | Long ............................ 244/62 |
| 4,831,438 A | 5/1989 | Bellman, Jr. et al. |
| 5,237,336 A * | 8/1993 | Jelloul ........................ 343/799 |
| 5,438,607 A * | 8/1995 | Przygoda et al. ............. 379/38 |
| 5,495,283 A * | 2/1996 | Cowe ........................... 725/33 |
| 5,731,785 A * | 3/1998 | Lemelson et al. ..... 342/357.07 |
| 5,742,336 A * | 4/1998 | Lee ............................. 348/144 |
| 5,798,458 A | 8/1998 | Monroe |
| 5,798,726 A * | 8/1998 | Schuchman et al. .......... 342/37 |
| 5,825,407 A * | 10/1998 | Cowe et al. ................ 725/143 |
| 5,949,473 A * | 9/1999 | Goodman ................ 348/14.12 |
| 6,459,411 B2 * | 10/2002 | Frazier et al. ............... 342/455 |
| 6,579,184 B1 * | 6/2003 | Tanskanen .................... 463/41 |
| 6,598,828 B2 * | 7/2003 | Fiebick et al. ........... 244/118.1 |
| 6,641,087 B1 * | 11/2003 | Nelson .................... 244/118.5 |
| 2003/0071743 A1 | 4/2003 | Seah |

FOREIGN PATENT DOCUMENTS

DE   197 32 806 A1   2/1999

OTHER PUBLICATIONS

New Surveillance System for Aircraft, May 17, 1998, by berwachung von Flugzeugen.*
European Office Action dated May 19, 2004, in German only.
Response to European Office Action dated Nov. 18, 2004, in Gernan only.

* cited by examiner

*Primary Examiner*—Nhon Diep
(74) *Attorney, Agent, or Firm*—Morrison & Foerster LLP

(57) ABSTRACT

An arrangement for audio, video and/or data communication between a ground station and an aircraft, having at least one communications channel and a monitoring device provided on board the aircraft includes at least one audio, video or flight data recording apparatus or combinations thereof, which can be activated either from on board the aircraft or by remote control from the ground station. The recording apparatus can be deactivated by remote control from the ground station and/or from on board the aircraft when it is on the ground. The arrangement also includes a memory for the data from the recording apparatus and a transmission apparatus for transmitting data from the recording apparatus and/or data read from the memory to the ground station. The transmission apparatus uses at least one communications channel in the arrangement for audio and/or video and/or data communication between the ground station and the aircraft.

8 Claims, 2 Drawing Sheets

COMMUNICATIONS INSTALLATION FOR AIRCRAFT

FIELD OF THE INVENTION

The invention relates to an arrangement for audio and/or video and/or data communication in accordance with the preamble of the main claim.

BRIEF DESCRIPTION OF THE DRAWINGS

Communications installations, particularly for audio communication (radio telephony) between an aircraft and a ground station and also between aircraft, are known. Terrestrial radio links in the VHF band are particularly common.

U.S. Pat. No. 5,742,336 discloses a monitoring system for aircraft. A plurality of video cameras and microphones are installed on board an aircraft; the corresponding video and audio data are transmitted to a ground station via a satellite link.

Figure 1:
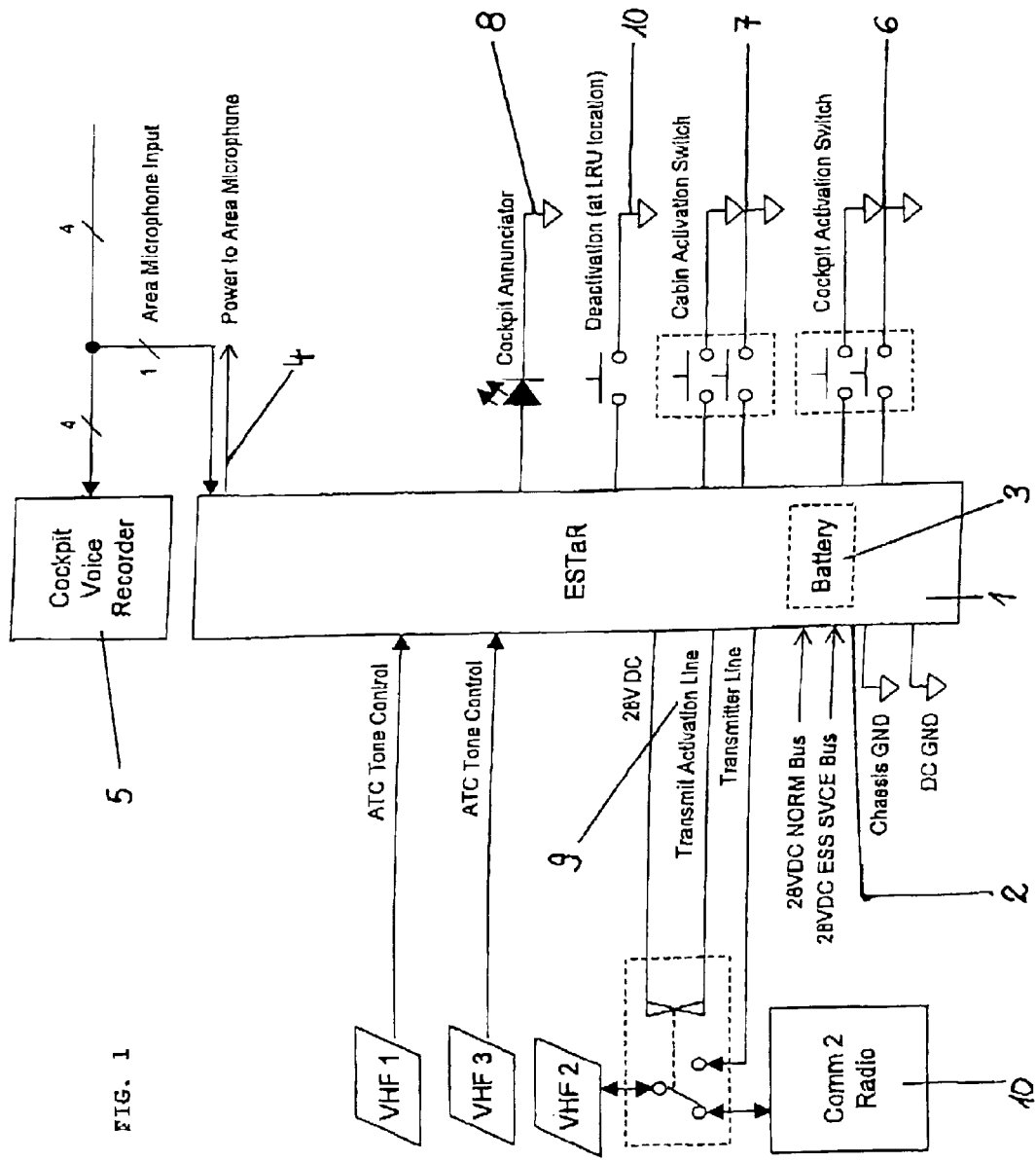

The invention is based on the object of providing a simple and inexpensive arrangement of the type mentioned in the introduction which additionally allows the aircraft to be monitored from a ground station.

SUMMARY OF THE INVENTION

The invention achieves this object by virtue of a monitoring device additionally being provided on board the aircraft and having the following features:
a) at least one audio and/or video and/or flight data recording apparatus,
b) the recording apparatus can be activated either from on board the aircraft or by remote control from the ground station,
c) the recording apparatus can be deactivated exclusively by remote control from the ground station and/or from on board the aircraft when it is on the ground,
d) a memory for the data from the recording apparatus,
e) a transmission apparatus for transmitting data from the recording apparatus and/or data read from the memory to the ground station,
f) the transmission apparatus uses at least one communications channel in the arrangement for audio and/or video and/or data communication between the ground station and the aircraft.

First, a few concepts used within the scope of the invention will be explained.

The inventive arrangement is provided for audio and/or video and/or data communication between a ground station and an aircraft. The term "arrangement" makes it clear that the invention comprises apparatuses arranged both on board the aircraft and in the ground station. The audio communication can, in particular, involve a radio link (simplex or duplex link). Data communication can involve, by way of example, continuous or intermittently repeated transmission of data such as engine data or other flight data.

The concept "ground station" refers to any base station communicating with the aircraft, said base station generally also being arranged at a physically fixed location on the ground, but not necessarily having to be so. Within the scope of the invention, it may also be a mobile base station, for example on board a vehicle, ship or another aircraft. This is also covered by the concept "ground station" within the scope of the invention.

The inventive arrangement has at least one communications channel. This means that at least one (audio, video or data) link can be set up between an aircraft and a ground station in one transmission direction. According to the invention, it is preferred if the bandwidth of this communications channel allows at least the transmission of audibly comprehensible audio data in real time, as in the case of an ordinary terrestrial VHF link, for example. Generally, an arrangement in accordance with the invention will have more than one communications channel. By way of example, a full-duplex voice link already has a second communications channel, so that it is possible to transmit audio data in both directions simultaneously. In general, an arrangement in accordance with the invention will have a plurality of communications channels (for example radio channels) which can be used simultaneously.

The inventive monitoring device provided has at least one audio and/or video and/or flight data recording apparatus. This may involve, in particular, microphones, video cameras and apparatuses for recording engine data, data from the control devices and the like. Preferably, a plurality of audio and/or video recording apparatuses are provided which, by way of example, can audibly and visibly record events in the cockpit and/or cabin in part or in full. When the recording apparatus is referred to within the scope of the invention, this is always also intended to cover the ordinary case of a plurality of recording apparatuses.

The recording apparatus can be activated either from on board the aircraft or by remote control from the ground station. Activation means that the apparatus starts to record audio or video data, for example. Preferably, to activate it from on board, a plurality of switches distributed inconspicuously over the cockpit and the cabin are provided, so that the cockpit or cabin crew can activate the recording apparatuses inconspicuously in the event of an aircraft hijack, for example. Remote-controlled activation from the ground station is advantageous if, for example in the event of an aircraft hijack, following a terrorist attack or a technical fault (pressure loss or the like), the cockpit and/or cabin crew are not able to act, or can act only to a restricted degree. In the case of occurrences which attract attention, such as flight data differing from the route plan (changes of course, sudden changes in altitude or the like), the ground station (air traffic controller) can then activate the monitoring system without any action by the aircraft crew in order to obtain a picture of the situation on board.

According to the invention, the recording apparatus can be deactivated exclusively by remote control from the ground station and/or from on board the aircraft when it is on the ground (for example using the LRU (line replaceable unit)). This is intended to prevent the aircraft crew from being able to deactivate the system again after the occurrence of an emergency on account of misjudgment of the situation or under external pressure (for example in the case of an aircraft hijack). Out of the same considerations, the invention preferably involves arranging the audio and/or video and/or flight data recording apparatuses and also other parts of the inventive arrangement so that they are hidden or inconspicuous, and also, if appropriate, physically protecting them by means of an appropriately solid housing or the like.

The invention provides a memory for the data from the recording apparatus. This memory preferably stores all the data preferably in all the recording apparatuses over a particular period. It can be an analog or preferably a digital memory, which stores the corresponding data in digitized form. It can preferably be memory chips (solid state memory), for example.

In addition, a transmission apparatus for transmitting data from the recording apparatus and/or data read from the memory to the ground station is provided. According to the invention, this transmission apparatus uses at least one communications channel in the inventive arrangement for the transmission operation. Within the scope of the invention, the transmission apparatus can transmit data from one or more recording apparatuses in real time provided that the capacity of the communications channel used is sufficient for this purpose. By way of example, a VHF radio channel can be used to listen to a monitoring microphone from the ground station in real time. Frequently, however, the capacity of the available communications channel or communications channels will not be sufficient to transmit all the data from all the recording apparatuses to the ground station in real time. Within the scope of the invention, provision is therefore made for the transmission apparatus optionally also to be able to transmit data read from the memory to the ground station. For this purpose, the ground station can advantageously specifically actuate the memory which is on board the aircraft by remote control and can read data stored therein. If, by way of example, the real-time audio monitoring of the cockpit indicates that a particular event has taken place at a particular time, the ground station can specifically retrieve video data for this time using the communications channel.

The particular advantage of the invention is that a particular communications infrastructure does not need to be set up for the monitoring device. Instead, according to the invention, the communications devices available on any aircraft anyway, which are generally narrowband communications devices, however, such as VHF radio, are additionally used as communications channels for the monitoring device. Although these communications channels available anyway frequently do not allow full real-time transmission of all the monitoring data, storage of these data in the on-board memory and the option of specific actuation and reading of the data from the memory by the ground station nevertheless allow the air traffic controller to obtain, within the scope of the invention, a full picture of the situation on board by also subsequently retrieving stored data.

The VHF band comprises frequencies from 30 to 300 MHz. Normally, VHF links between an aircraft and a ground station or between aircraft are amplitude-modulated, but other types of modulation, particularly frequency or phase modulation, are likewise conceivable. Within the scope of the invention, communications links in other frequency bands, such as in the UHF band (0.3 to 3 GHz) or possibly in the minimum-wave and shortwave range (1.6 to 30 MHz), can likewise be used.

With this ability, which is preferred within the scope of the invention, to control selection of the data to be transmitted using the transmission apparatus from among data from the recording apparatus (for example selection of the microphones or cameras) or stored data, it is also preferred that the data from the recording apparatus are stored in the memory with an identifier indicating the recording time and/or location. Data to be transmitted to the ground station can then be selected from the memory, within the scope of the invention, by virtue of the ground station transmitting to the aircraft an identifier containing a recording time and a recording location (for example cockpit camera). This identifier is then used to select the appropriate data from the memory, to read them and to transmit them to the ground station using the communications channel.

The invention also relates to a monitoring device which is set up for use in an arrangement in accordance with the invention. This monitoring device can be incorporated into an existing installation (for example a VHF radio installation), so that an arrangement in accordance with the invention is produced.

The inventive memory preferably has the mechanical and thermal resistance capability of a cockpit voice recorder or other flight data writer (black box). It is preferably designed for fully recording the data from all the recording apparatuses over a period of at least 15 min, preferably at least 30 min, and more preferably at least 1 h.

BRIEF DESCRIPTION OF THE DRAWINGS

Figure 2:
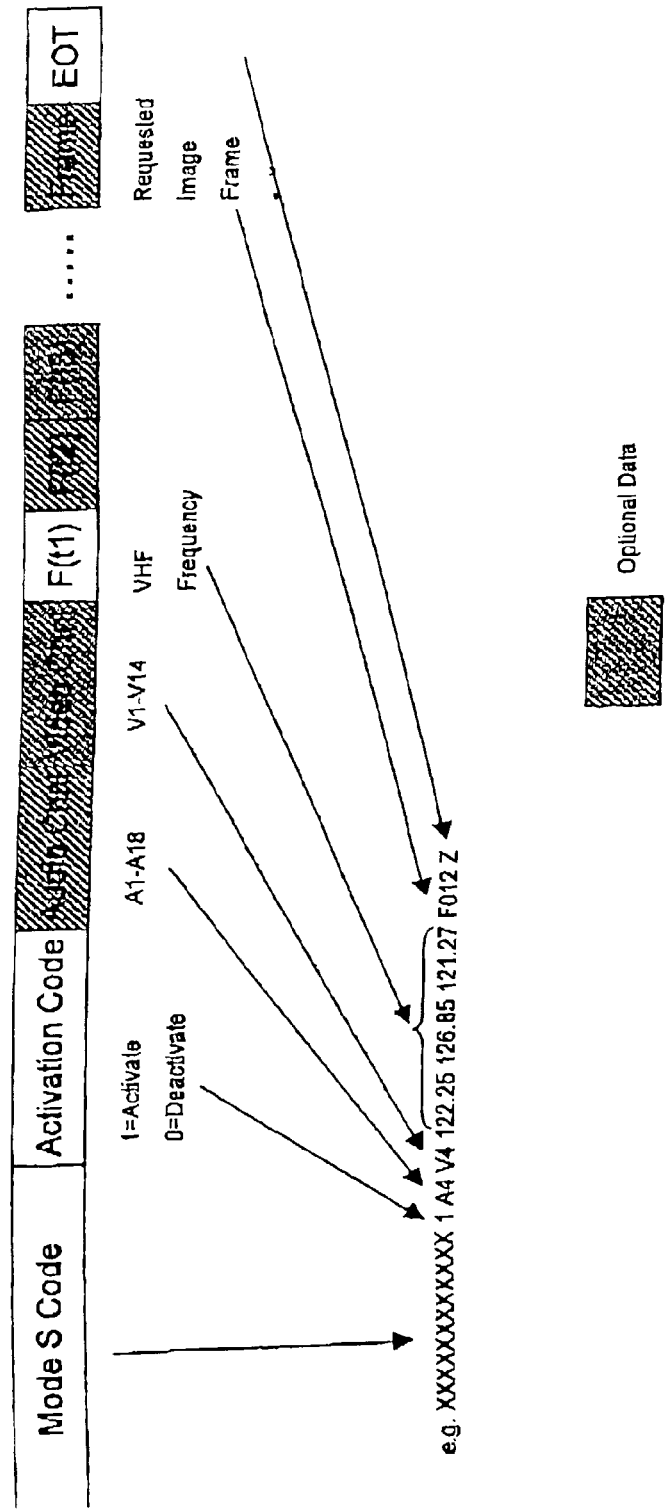

An exemplary embodiment of the invention is described below with reference to the drawings, in which:

FIG. 1 schematically shows the on-board communications and monitoring device in the inventive arrangement;

FIG. 2 schematically shows an example of activation or control of the on-board part of the arrangement by a ground station.

DETAILED DESCRIPTION OF THE INVENTION

The on-board central unit 1 contains the memory for data from the audio, video and/or flight data recording apparatuses, connections for appropriate recording apparatuses, and also for supplying power, the transmission apparatus for communicating with the ground station and other operating or display apparatuses.

The central unit 1 has the mechanical and thermal resistance capability of a cockpit voice recorder, which means that data stored therein are maintained in readable form even after an aircraft crash. It is preferably arranged in a region of the aircraft which is not accessible during the flight or can be accessed only with difficulty. The central unit 1 is connected to the on-board power supply, as indicated at 2. As a backup power supply, an internally arranged battery 3 is provided.

4 indicates the inputs for audio, video and/or flight data recording apparatuses. Generally, a connection for at least one microphone arranged in the cockpit is provided. If required, such a microphone can be connected both to the central unit 1 and to the usual cockpit voice recorder 5. Preferably, inputs for additional microphones are provided, these microphones possibly being arranged, by way of example, in the aircraft cabin, in the hold, or in functional areas, such as galleys or toilets, or the like. The central unit 1 is set up for parallel recording of all the audio information delivered by the microphones.

It is also preferred if connections for video cameras which, within the scope of the invention, can also be combined with a microphone are also provided. In this way, by way of example, events in the cockpit, in the cabin, in the hold or the like can be recorded and stored in the central unit 1. The available storage means are preferably digital memories, such as memory chips (solid state memory), which can record the data from each input channel for a period of one hour. In addition, the connections 4 can also be provided for flight data recording apparatuses, for example can record flight data such as altitude, speed or the like, engine data, position of the control elements for the engines or other devices on the aircraft and the like.

Switches 6, 7 which are arranged inconspicuously in the cockpit and preferably in the cabin and are easy for the crew to reach are used for activating the central unit. A signal device 8, which is preferably likewise arranged inconspicuously, indicates to the cockpit crew that the central unit has been activated.

As indicated at 9, the central unit is connected to an ordinary VHF radio 10. This radio 10 is preferably set up for simultaneously transmitting and, in particular, receiving on a plurality of VHF channels, which are indicated in the drawing by the labels VHF 1, VHF 2 and VHF 3. The inventive arrangement is then activated from the ground station by transmitting an activation signal, which will be explained later, on a VHF channel which is constantly switched to reception in the radio 10. Normal VHF frequencies for this purpose are 121.5 or 243 MHz, for example. The inventive arrangement can be deactivated from on board only when the aircraft is on the ground, using a switch which is arranged on the LRU (line replaceable unit) rack.

In normal flight mode, the central unit 1 is in the deactivated state. This means that it transmits no data of any kind to the ground station using the VHF link from the radio 10. In this deactivated state, the central unit 1 and, if appropriate, the audio, video and/or flight data recording apparatuses connected to the connections 4 can be off completely; alternatively, the connections 4 can be used to record appropriate data in the internal memory of the central unit 1 without any transmission of data to the ground station. In this case, old data in the memory in the central unit 1 are continually overwritten as soon as the storage capacity is exhausted. By way of example, appropriate audio, video and flight data for the past hour are then continually stored. This deactivated state in which the data are still recorded internally has the advantage that, following activation, it is also possible to request events from the period before activation. By way of example, in the case of an aircraft hijack, the ground station can obtain information about where aircraft hijackers originally sat and how they got into the cockpit.

The central unit 1 is activated either using switches 6, 7 already described or by secure remote control from the ground station using a specific activation code. A receiver in the radio 10 is constantly switched to reception on an appropriate VHF channel, such as 121.5 or 243 MHz. When a specific activation code in the form of a touch tone is received, it is routed to the central unit 1 and activates the latter.

Following activation, the central unit 1 occupies a VHF communications channel in the radio 10 and uses it to transmit data to the ground station. If it has been activated, either by the switches 6, 7 or else from the ground station, without more precise specification of the signals which need to be transmitted, the central unit 1 first transmits a preset standard signal, for example the sound recorded by the cockpit microphone is transmitted in real time.

The ground station can use another VHF channel for secure remote control of the central unit 1 using "touch tones". FIG. 2 shows an example of a touch tone, composed of various signals, for remotely controlling the central unit 1. First, a "mode S code" is transmitted which signals to the central unit 1 that control codes follow. The activation code is used to switch the central unit 1 from the inactive state to the active state. Conversely, it can be deactivated again in this manner. A VHF channel (denoted by F(t1) in the figure) is then prescribed which will be used to set up the link between central unit and ground station. An EOT signal signals the end of the command sequence. The aforementioned components of the touch tone have a white background in the drawing and are compulsory components of every command sequence to the central unit.

Additional optional components of such a command sequence are shown in dashes in the drawing. Thus, activation of the central unit 1 can be followed by specific selection of a particular audio channel (selection from the available microphones) or a particular video channel for transmission. In addition, a plurality of VHF frequencies can be switched for transmission if the radio provides an appropriate number of channels. Finally, the command part denoted by Frame in the figure can specifically retrieve particular stored video recordings or pictures from the memory in the central unit 1. The data from the recording apparatuses, particularly from the video recording apparatuses, are stored in the memory in the central unit 1 with an identifier indicating the recording time and recording location. The ground station can use an appropriate command for specifically retrieving pictures from the memory from a particular camera location on the aircraft at a particular time. This opportunity for specific subsequent retrieval of video data takes account of the fact that VHF communications channels have two narrow a bandwidth for transmitting picture or video data in real time. The ground station can, by way of example, listen to audio data in real time and then specifically retrieves data only for those locations and times for which sufficient clarification of the situation on board cannot be obtained from the audio data alone.

The invention allows data, particularly video data, to be divided into data blocks within the central unit 1 and allows these blocks to be transmitted to the ground station simultaneously using a plurality of VHF channels. This packet-by-packet parallel transmission permits faster transmission of large data records, particularly for pictures and video data.

Particularly when video data are recorded in the memory in the central unit 1, it can be useful for known compression algorithms to be used, when storing a plurality of frames succeeding one another in time, to store, by way of example, only the respective changes and not the entire picture.

An appropriate touch tone can be used to deactivate the central unit 1 again by secure remote control from the ground station. Deactivation from on board is possible only when the aircraft is on the ground, using the switch 10 arranged on the LRU rack.

The invention claimed is:

1. A monitoring device for use on board an aircraft for audio, video or data communication between a ground station and an aircraft over at least one communications channel, comprising:
   a) at least one cockpit audio data recording apparatus which is activated by remote control from the ground station by touch-tone signals sent over a VHF communications channel and is deactivated exclusively by remote control from the ground station by touch-tone signals sent over the same VHF communications channel as is used for the activation,
   b) a memory for data from the recording apparatus,
   c) a transmission apparatus for transmitting data from the recording apparatus or data read from the memory to the ground station, which transmission apparatus uses the same VHF communications channel as is used for communication between the ground station and the aircraft.

2. The device as claimed in claim 1, further comprising an apparatus which can be controlled by the ground station for the purpose of selecting the data to be transmitted using the transmission apparatus from among the data from the recording apparatus or stored data.

3. The device as claimed in claim 1 or 2, wherein the data from the recording apparatus are stored in the memory with an identifier indicating the recording time and/or location.

4. The device as claimed in claim 1 or 2, wherein the memory has the mechanical and thermal resistance of a cockpit voice recorder.

5. The device as claimed in claim 1 or 2, wherein the memory is designed for filly recording the data from the recording apparatus in the monitoring device over a period of at least 15 min.

6. A monitoring device for use on board an aircraft, comprising:
   a) at least one cockpit audio data recording apparatus which is activated by remote control from the ground station by touch-tone signals sent over a VHF communications channel and is deactivated exclusively by remote control from the ground station by touch-tone signals sent over a VHF communications channel,
   b) a memory for data from the recording apparatus and
   c) a transmission apparatus for transmitting data from the recording apparatus or data read from the memory over a VHF communications channel to the ground station, which is set up to use at least one communications channel in an on-board system for audio communication between the aircraft and a ground station.

7. The device as claimed in claim 1 or 2, wherein the memory is designed for fully recording the data from the recording apparatus in the monitoring device over a period of at least 30 min.

8. The device as claimed in claim 1 or 2, wherein the memory is designed for fully recording the data from the recording apparatus in the monitoring device over a period of least 1 hour.

* * * * *

UNITED STATES PATENT AND TRADEMARK OFFICE
CERTIFICATE OF CORRECTION

| | | |
|---|---|---|
| PATENT NO. | : 7,271,826 B2 | Page 1 of 1 |
| APPLICATION NO. | : 10/188367 | |
| DATED | : September 18, 2007 | |
| INVENTOR(S) | : Andrew Muirhead et al. | |

It is certified that error appears in the above-identified patent and that said Letters Patent is hereby corrected as shown below:

In the Claims:

In Claim 5, column 7, line 8, delete "filly" and replace with -- fully --

Signed and Sealed this

Eighteenth Day of December, 2007

JON W. DUDAS
*Director of the United States Patent and Trademark Office*